(12) United States Patent
Mousseau et al.

(10) Patent No.: US 8,949,456 B2
(45) Date of Patent: Feb. 3, 2015

(54) SYSTEM AND METHOD FOR REDIRECTING DATA TO A WIRELESS DEVICE OVER A PLURALITY OF COMMUNICATION PATHS

(75) Inventors: Gary P. Mousseau, Waterloo (CA); Peter J. Edmonson, Hamilton (CA); Mihal Lazaridis, Waterloo (CA)

(73) Assignee: BlackBerry Limited, Waterloo (CA)

( * ) Notice: Subject to any disclaimer, the term of this patent is extended or adjusted under 35 U.S.C. 154(b) by 681 days.

(21) Appl. No.: 11/925,833

(22) Filed: Oct. 27, 2007

(65) Prior Publication Data

US 2008/0043676 A1 Feb. 21, 2008

Related U.S. Application Data

(63) Continuation of application No. 09/925,810, filed on Aug. 9, 2001, now Pat. No. 7,606,936, and a continuation-in-part of application No. 09/782,380, filed on Feb. 13, 2001, now Pat. No. 6,389,457, which is a continuation of application No. 09/087,623, filed on May 29, 1998, now Pat. No. 6,219,694.

(51) Int. Cl.
*G06F 15/173* (2006.01)
*H04W 4/16* (2009.01)
*H04L 12/58* (2006.01)
(Continued)

(52) U.S. Cl.
CPC ............ *H04L 12/5855* (2013.01); *H04W 4/16* (2013.01); *H04L 12/5895* (2013.01); *H04W 60/00* (2013.01); *H04W 88/06* (2013.01); *H04L 51/14* (2013.01)
USPC ........................................................ 709/238

(58) Field of Classification Search
USPC ........................ 709/220, 239; 455/436, 444
See application file for complete search history.

(56) References Cited

U.S. PATENT DOCUMENTS

| 5,181,200 A | 1/1993 | Harrison |
| 5,210,785 A | 5/1993 | Sato et al. |

(Continued)

FOREIGN PATENT DOCUMENTS

| CA | 2182586 A1 | 8/1995 |
| EP | 0814623 | 12/1997 |

(Continued)

OTHER PUBLICATIONS

US Office Action, U.S. Appl. No. 11/925,831, United States Patent & Trademark Office, Jul. 15, 2010, 10 pgs.

(Continued)

*Primary Examiner* — Scott Christensen
(74) *Attorney, Agent, or Firm* — The Danamraj Law Group, P.C.

(57) ABSTRACT

A scheme for redirecting data to a mobile communication device capable of communicating via at least one short-range wireless communication path and at least one long-range wireless communication path. An embodiment comprises one or more of the following: a structure for setting a redirection flag configured for a user associated with a mobile communication device to enable continuous redirection of data items thereto from a host system until the redirection flag is reset to indicate cessation of redirection of the data items. Thereafter, the embodiment is operable to determine whether the mobile communication device is within coverage of a cell of a plurality of cells, each cell being operable with an associated short-range wireless communication path, whereby a data item is redirected accordingly.

19 Claims, 10 Drawing Sheets

(51) Int. Cl.
*H04W 60/00* (2009.01)
*H04W 88/06* (2009.01)

(56) References Cited

U.S. PATENT DOCUMENTS

| | | | |
|---|---|---|---|
| 5,548,789 A | 8/1996 | Nakanura | |
| 5,590,417 A | 12/1996 | Rydbeck | |
| 5,671,436 A * | 9/1997 | Morris et al. | 1/1 |
| 5,870,563 A | 2/1999 | Roper et al. | |
| 6,055,426 A | 4/2000 | Beasley | |
| 6,255,800 B1 | 7/2001 | Bork | |
| 6,323,775 B1 | 11/2001 | Hansson | |
| 6,339,706 B1 * | 1/2002 | Tillgren et al. | 455/419 |
| 6,408,187 B1 | 6/2002 | Merriam | |
| 6,449,722 B1 | 9/2002 | West et al. | |
| 6,473,630 B1 | 10/2002 | Baranowski et al. | |
| 6,480,593 B1 | 11/2002 | Munday et al. | |
| 6,549,543 B1 | 4/2003 | Shin | |
| 6,560,468 B1 | 5/2003 | Boesen | |
| 6,697,638 B1 | 2/2004 | Larsson et al. | |
| 6,714,797 B1 | 3/2004 | Rautila | |
| 6,766,160 B1 | 7/2004 | Lemilainen et al. | |
| 6,823,195 B1 | 11/2004 | Boesen | |
| 6,834,192 B1 | 12/2004 | Watanabe et al. | |
| 6,871,063 B1 | 3/2005 | Schiffer | |
| 6,874,037 B1 | 3/2005 | Abram et al. | |
| 7,123,936 B1 | 10/2006 | Rydbeck et al. | |
| 7,127,734 B1 * | 10/2006 | Amit | 725/80 |
| 7,136,999 B1 | 11/2006 | Griffiths | |
| 2001/0002912 A1 * | 6/2001 | Tony et al. | 370/487 |
| 2001/0040627 A1 * | 11/2001 | Obradovich | 348/222 |
| 2001/0041552 A1 * | 11/2001 | Wingren et al. | 455/404 |
| 2002/0191627 A1 * | 12/2002 | Subbiah et al. | 370/428 |
| 2002/0193846 A1 * | 12/2002 | Pool et al. | 607/60 |

FOREIGN PATENT DOCUMENTS

| | | | |
|---|---|---|---|
| EP | 2219395 | 8/2010 | |
| WO | 9749251 | 12/1997 | |
| WO | 9945684 A2 | 9/1999 | |
| WO | 9963709 A2 | 12/1999 | |
| WO | WO 99/63709 | * 12/1999 | H04L 12/28 |
| WO | 0003553 A1 | 1/2000 | |
| WO | 00/35210 | 6/2000 | |

OTHER PUBLICATIONS

Chinese Office Action, Application No. 0817374.8, State IPO of People's Republic of China, Apr. 1, 2005, 4 pgs.
Chinese Office Action, Application No. 0817374.8, State IPO of People's Republic of China, Mar. 14, 2008, 2 pgs.
Chinese Office Action, Application No. 0817374.8, State IPO of People's Republic of China, Jul. 10, 2009, 2 pgs.
Chinese Office Action, Application No. 0817374.8, State IPO of People's Republic of China, Dec. 18, 2009, 2 pgs.
EPO Examination Report, Application No. 01 964 788.2, European Patent Office, Nov. 17, 2008, 5 pgs.
EPO Examination Report, Application No. 01 964 788.2, European Patent Office, Jun. 25, 2007, 6 pgs.
EPO Examination Report, Application No. 01 964 788.2, European Patent Office, Sep. 5, 2005, 7 pgs.
EPO ESSR, Application No. 10164840.0, European Patent Office, Sep. 8, 2010, 8 pgs.
Canadian Office Action, Application No. 2,420,250, Canadian Intellectual Property Office, Feb. 22, 2007, 3 pgs.
Canadian Office Action, Application No. 2,420,250, Canadian Intellectual Property Office, Mar. 5, 2008, 3 pgs.
Canadian Office Action, Application No. 2,420,250, Canadian Intellectual Property Office, Feb. 3, 2009, 2 pgs.
Canadian Office Action, Application No. 2,420,250, Canadian Intellectual Property Office, Oct. 8, 2009, 3 pgs.
SIPO, Details of the First Office Action, Application No. 201010224593.1, Apr. 20, 2011, 9 pgs.
EPO, Communication Under Rule 71(3) EPC, Application No. 01964788.2, May 1, 2010, 6 pgs.
EPO, Communication Pursuant to Article 94(3) EPC, Application No. 10164840.0, Dec. 15, 2011, 6 pgs.
IPEA/EPO, Written Opinion, Application No. PCT/CA01/01215, Aug. 22, 2003, 6 pgs.
IPEA/EPO, Notice of Transmittal of the International Preliminary Examination Report & International Preliminary Examination Report, Application No. PCT/CA01/01215, Nov. 28, 2003, 6 pgs.
ISA/EPO, Notice of Transmittal of the International Search Report & International Search Report, Application No. PCT/CA01/01215, Aug. 13, 2003, 7 pgs.
SIPO, First Office Action, Application No. 201010224593.1, Apr. 20, 2011, 5 pgs.
SIPO, Notification of Grant of Rights for Invention Patent, Application No. 201010224593.1, Jan. 11, 2012, 2 pgs.
Dawson et al., iCalendar Message Based Interoperability Protocol (iMPI), RFC 2447, Nov. 30, 1998, 19 pgs., Internet Engineering Task Force, Network Working Group.
McDonald et al., PF_KEY Key Management API, v2, RFC 2367, Jul. 31, 1998, 74 pgs., Internet Engineering Task Force, Network Working Group.
Vincent et al., Computer Notification of a Meeting, IBM Technical Disclosure Bulletin, vol. 26, No. 8, Jan. 1, 1984, p. 4379, IBM Corp., New York, NY.
EPO, Extended Search Report, Application No. 10164840.0, Jun. 9, 2011, 7 pgs.
USPTO, Office Action, U.S. Appl. No. 09/925,810, Mar. 11, 2008, 6 pgs.
USPTO, Office Action, U.S. Appl. No. 09/925,810, Jul. 11, 2008, 33 pgs.
USPTO, Office Action, U.S. Appl. No. 09/925,810, Dec. 8, 2008, 25 pgs.
United States District Court Southern District of New York, Complaint, Document 1, *Mahmood v. Research in Motion Ltd.*, Case 1:11-cv-05345-KBF, Filed Aug. 1, 2011, 432 Pgs.
United States District Court Southern District of New York, Motion to Dismiss, Document 12, *Mahmood v. Research in Motion Ltd.*, Case 1:11-cv-05345-KBF, Filed Aug. 22, 2011, 29 Pgs.
United States District Court Southern District of New York, Opposition to Motion to Dismiss, Document 14, *Mahmood v. Research in Motion Ltd.*, Case 1:11-cv-05345-KBF, Filed Nov. 6, 2011, 32 Pgs.
United States District Court Southern District of New York, Reply Memorandum in Support of Motion to Dismiss, Document 15, *Mahmood v. Research in Motion Ltd.*, Case 1:11-cv-05345-KBF, Filed Nov. 17, 2011, 14 Pgs.
United States District Court Southern District of New York, Plaintiffs Response to Defendant's Letter Submission, Document 29, *Mahmood v. Research in Motion Ltd.*, Case 1:11-cv-05345-KBF, Filed Dec. 28, 2011, 7 Pgs.
United States District Court Southern District of New York, Memorandum Opinion and Order, Document 35, *Mahmood v. Research in Motion Ltd.*, Case 1:11-cv-05345-KBF, Filed Jan. 24, 2012, 24 Pgs.
United States District Court Southern District of New York, Plaintiffs Opposition to Defendant's Second Motion for Summary Judgment, Document 45, *Mahmood v. Research in Motion Ltd.*, Case 1:11-cv-05345-KBF, Filed Mar. 2, 2012, 29 Pgs.
United States District Court Southern District of New York, Complaint, Document 1, *Mahmood v. Research in Motion Ltd.*, Case 1:12-cv-00899-KBF, Filed Feb. 3, 2012, 416 Pgs.
Jones, Gregory, Packet Radio: Introduction to Packet Radio, Originally published in Packet Radio: What? Why? How? I Articles and Information on General Packet Radio Topics, APR Publication #95-1, 1995, 9 pgs.
Motorola, AirMobile, Software for Lotus cc: Mail Wireless, Communication Server Guide, V.1.1, Motorla, Inc. 1995, 24 pgs.
Motorola, emailVClient, 4 pgs., 2001, Motorola, Inc.
United States District Court Southern District of New York, Opinion and Order of the Court, Document 71, *Mahmood v. Research in Motion Ltd.*, Case 1:11-cv-05345-KBF, Filed May 16, 2012, 20 pgs.
EPO, Invitation pursuant to Article 94(3) and Rule 71(1) EPC, Application No. 10164840.0, Apr. 18, 2012, 4 pgs.

(56) References Cited

OTHER PUBLICATIONS

United States District Court Southern District of New York, Notice of Motion, Document 14, *Mahmood v. Research in Motion Ltd.*, Case 1:12-cv-00899-KBF, Filed Jun. 14, 2012, 2 Pgs.

United States District Court Southern District of New York, Memorandum of Law of Defendant Research in Motion Limited in Support of Its Motion to Dismiss the Complaint, Document 15, *Mahmood v. Research in Motion Ltd.*, Case 1:12-cv-00899-KBF, Filed Jun. 14, 2012, 32 Pgs.

United States District Court Southern District of New York, Declaration of Michael S. Feldberg, Document 16, *Mahmood v. Research in Motion Ltd.*, Case 1:12-cv-00899-KBF, Filed Jun. 14, 2012, 2 Pgs.

United States District Court Southern District of New York, Plaintiff Tahir Mahmood's Memorandum of Law in Opposition to Defendant Research in Motion Limited's Motion to Dismiss the Complaint, Document 18, *Mahmood v. Research in Motion Ltd.*, Case 1:12-cv-00899-KBF, Filed Jun. 28, 2012, 32 Pgs.

United States District Court Southern District of New York, Reply Memorandum of Law of Defendant Research in Motion Limited in Further Support of Its Motion to Dismiss, Document 19, *Mahmood v. Research in Motion Ltd.*, Case 1:12-cv-00899-KBF, Filed Jul. 9, 2012, 15 Pgs.

United States District Court Southern District of New York, Opinion and Order, Document 22, *Mahmood v. Research in Motion Ltd.*, Case 1:12-cv-00899-KBF, Filed Oct. 25, 2012, 15 Pgs.

EPO, Invitation pursuant to Article 94(3) and Rule 71(1) EPC, Application No. 10164840, Feb. 13, 2013, 3 pgs.

EPO, Communication under Rule 71(3) EPC, Intention to Grant, Application No. 10164840.0, Oct. 28, 2013, 5 pgs.

\* cited by examiner

SYSTEM AND METHOD FOR REDIRECTING DATA TO A WIRELESS DEVICE OVER A PLURALITY OF COMMUNICATION PATHS

CROSS REFERENCE TO RELATED APPLICATIONS

This application is a continuation of U.S. patent application Ser. No. 09/925,810, filed on Aug. 9, 2001, now issued as U.S. Pat. No. 7,606,936, which is a continuation-in-part of U.S. patent application Ser. No. 09/782,380, filed on Feb. 13, 2001, now issued as U.S. Pat. No. 6,389,457, which is a continuation of U.S. patent application Ser. No. 09/087,623, filed on May 29, 1998, now issued as U.S. Pat. No. 6,219,694, entitled "System and Method for Pushing Information from a Host System to a Mobile Data Communication Device." The parent patent application Ser. No. 09/925,810 also claims priority from U.S. Provisional Application Ser. No. 60/227,947, filed on Aug. 25, 2000. The entire disclosure of each of these applications and issued patent(s), including the specification and drawing figures therein, is hereby incorporated into the present application by reference.

BACKGROUND

1. Field of the Invention

The present invention is directed toward the field of data communications using a mobile device. More specifically, the invention relates to the art of redirecting data to a mobile device having a wireless interface capable of communicating over a plurality of communication paths.

2. Description of the Related Art

Systems and methods for replicating data from a host system, such as a desktop computer system or a network server, to a user's mobile device are known. These systems typically employ "synchronization" schemes in which the user's data is warehoused (or stored) at the host system for an indefinite period of time and then is transmitted in bulk only in response to a user request. In order to replicate the stored data, the user typically places their mobile device in an interface cradle that is electrically connected to the host system, and then executes a command, either at the mobile device or the host system, to begin replication. These known techniques employ a "pull" paradigm that requires the user to take affirmative steps to obtain data from the host system. The only point in time at which the host system and the mobile device are truly "synchronized," is at the moment of replication. Several minutes, or even seconds later, a new data item could arrive at the host system (or the mobile device), but this new data item will only be synchronized at the next instance of the replication command being executed.

Systems for redirecting phone calls, or aggregating phone numbers into one phone number, are also known. These systems require the user to manually reconfigure an aggregating phone switch using a plurality of phone numbers so that calls are routed to a new location. Also known are systems that track the number of rings on a given phone number and re-route the call to another number after a set number of unanswered ring signals. In this type of system, special voice messages are sometimes presented to the user asking them to wait while the call is re-routed. Oftentimes the caller will hang up in response to such a message rather than waiting for additional ring signals on another phone number.

Another known type of system for communicating data to mobile devices is the original paging-based system. This type of system uses a small device on the belt that can display a phone number to call in case of emergencies. These systems were typically offered as third-party services that were remote to a company's facilities, and did not relate to communicating the company's private, secure data to mobile users. Advanced versions of these paging systems can transmit an alphanumeric message or even a simple E-mail message limited to about 170 characters or less. To use these systems, the user must accept a second E-mail address, a second phone number, or a contact number and sometimes a third number called a Personal Identification Number (PIN) to communicate with the paging device. These systems also do not provide robust security and privacy, which is a major concern when transmitting sensitive corporate data outside the corporate network.

SUMMARY

A system and method for redirecting data to a mobile device having a long-range RF transceiver and a short-range RF transceiver is provided. The system determines whether the mobile device is in physical proximity to the short-range RF network, and if so, redirects data to the mobile device via the short-range RF network, and if not, redirects data to the mobile device via the long-range RF network. Multiple methods for determining the physical location of the mobile device are provided. Also provided is a short-range RF network including a plurality of RF-enabled interface cradles for generating a network of pico-cells within one or more office locations. As a mobile device comes within the vicinity of one of these pico-cells, contact information is provided to the system indicating the physical location of the mobile device.

BRIEF DESCRIPTION

Figure 8:
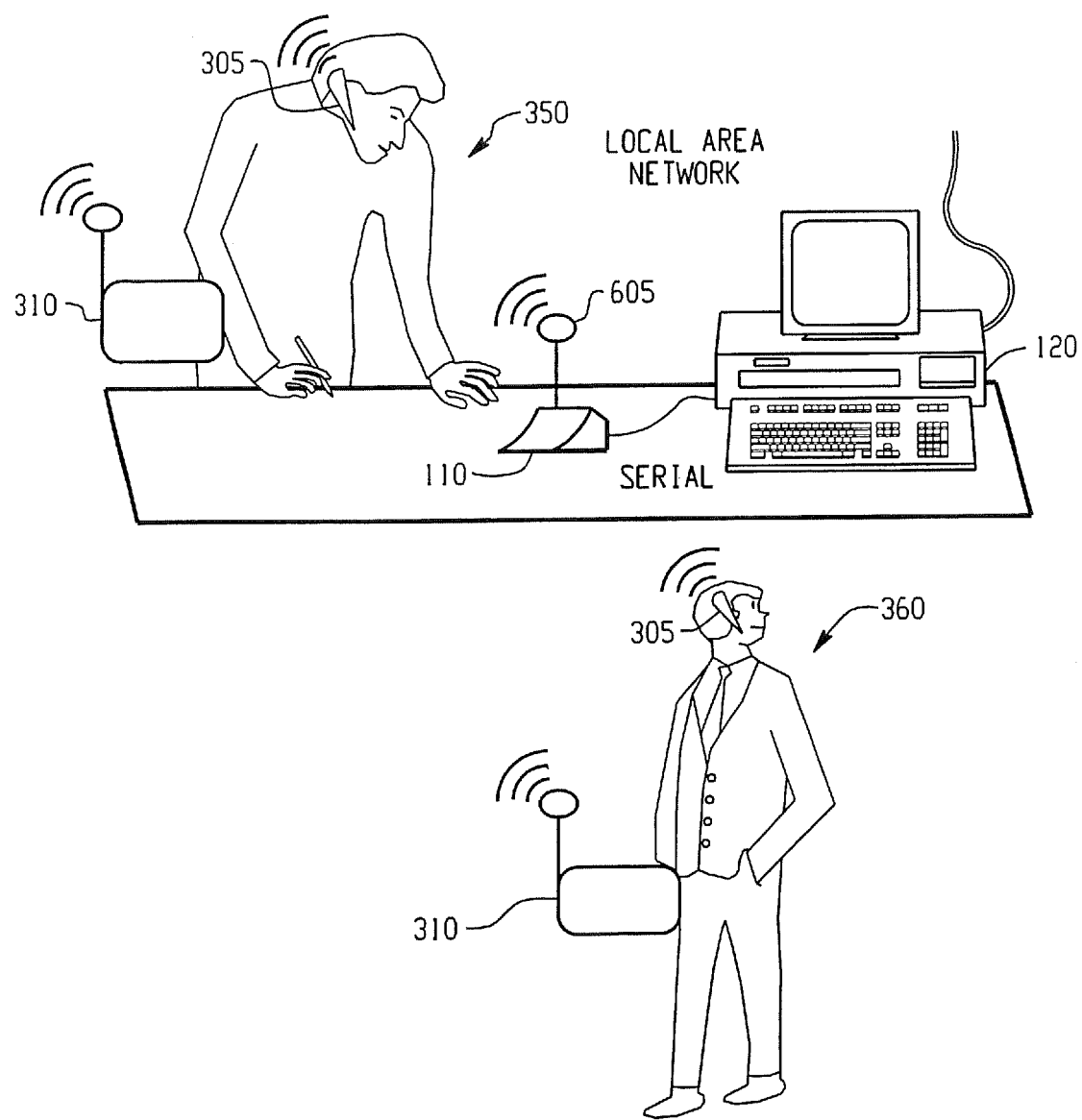
FIG. 8 depicts a first user of a mobile device such as shown in FIGS. 4-7 communicating via a first communication path comprising a short range wireless link, and a second user having a mobile device such as shown in FIGS. 4-7 communicating via a second communication path comprising a long range wireless link.
Figure 9:
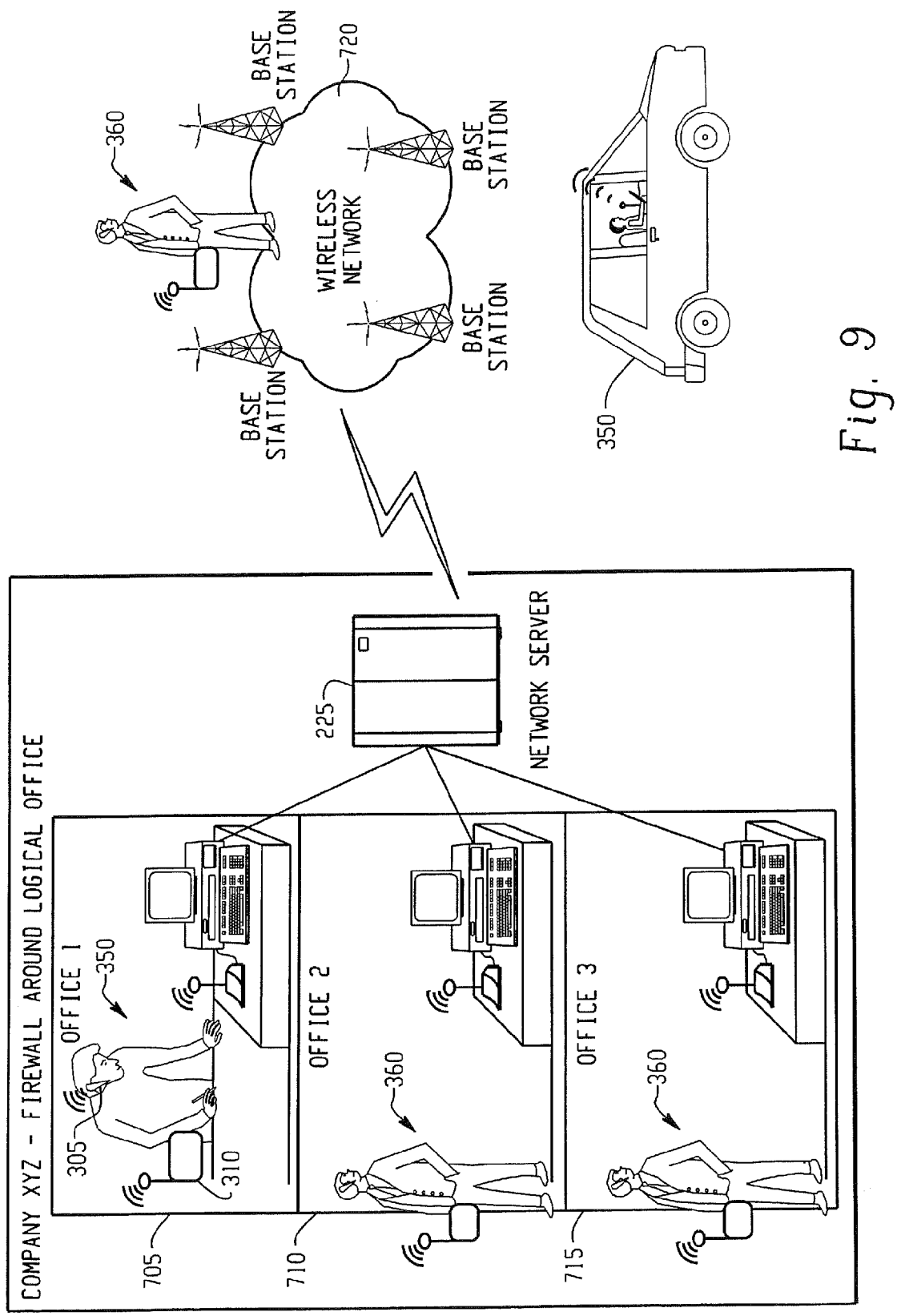
Figure 10:
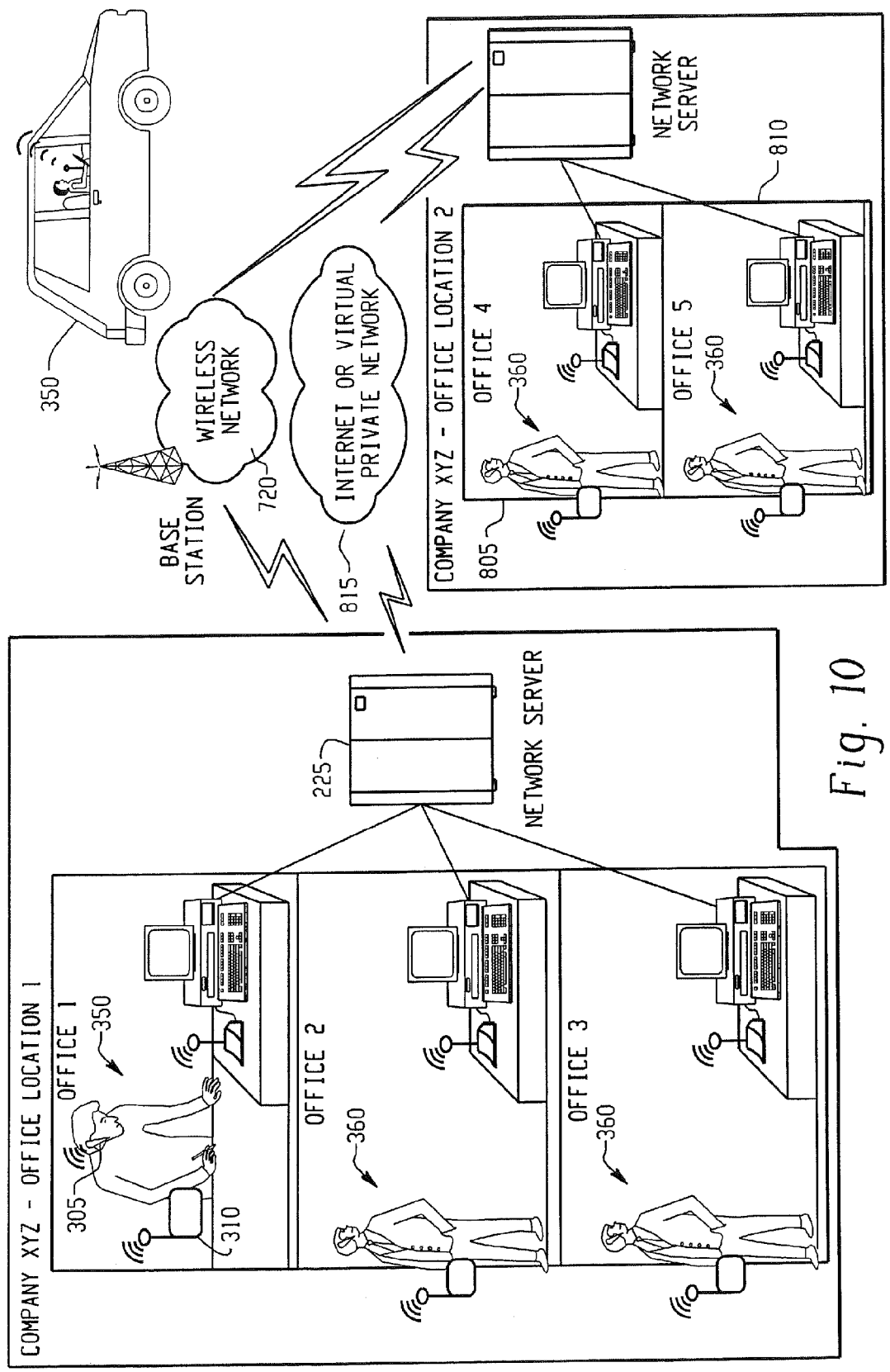
Figure 11:
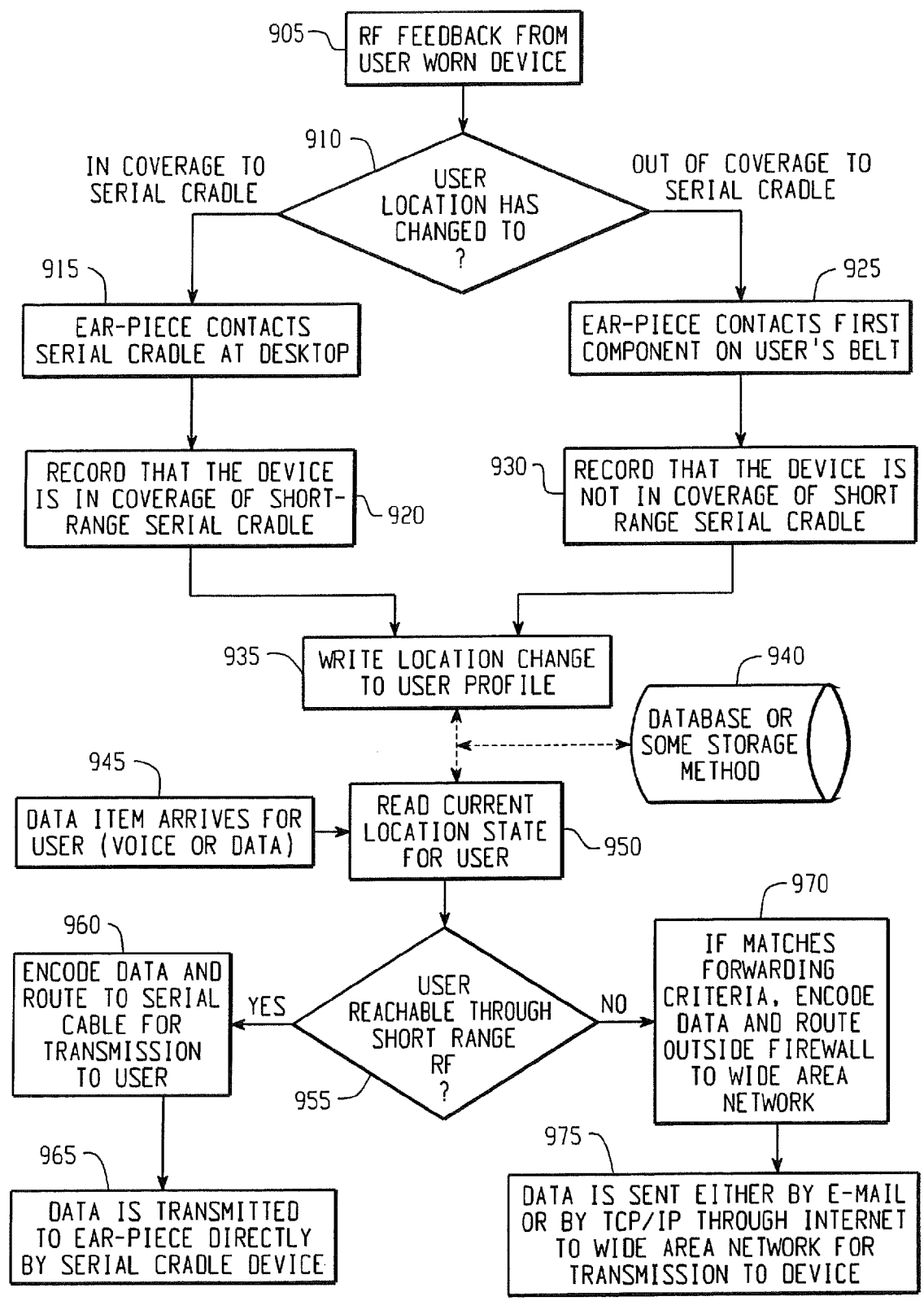
Figure 12:
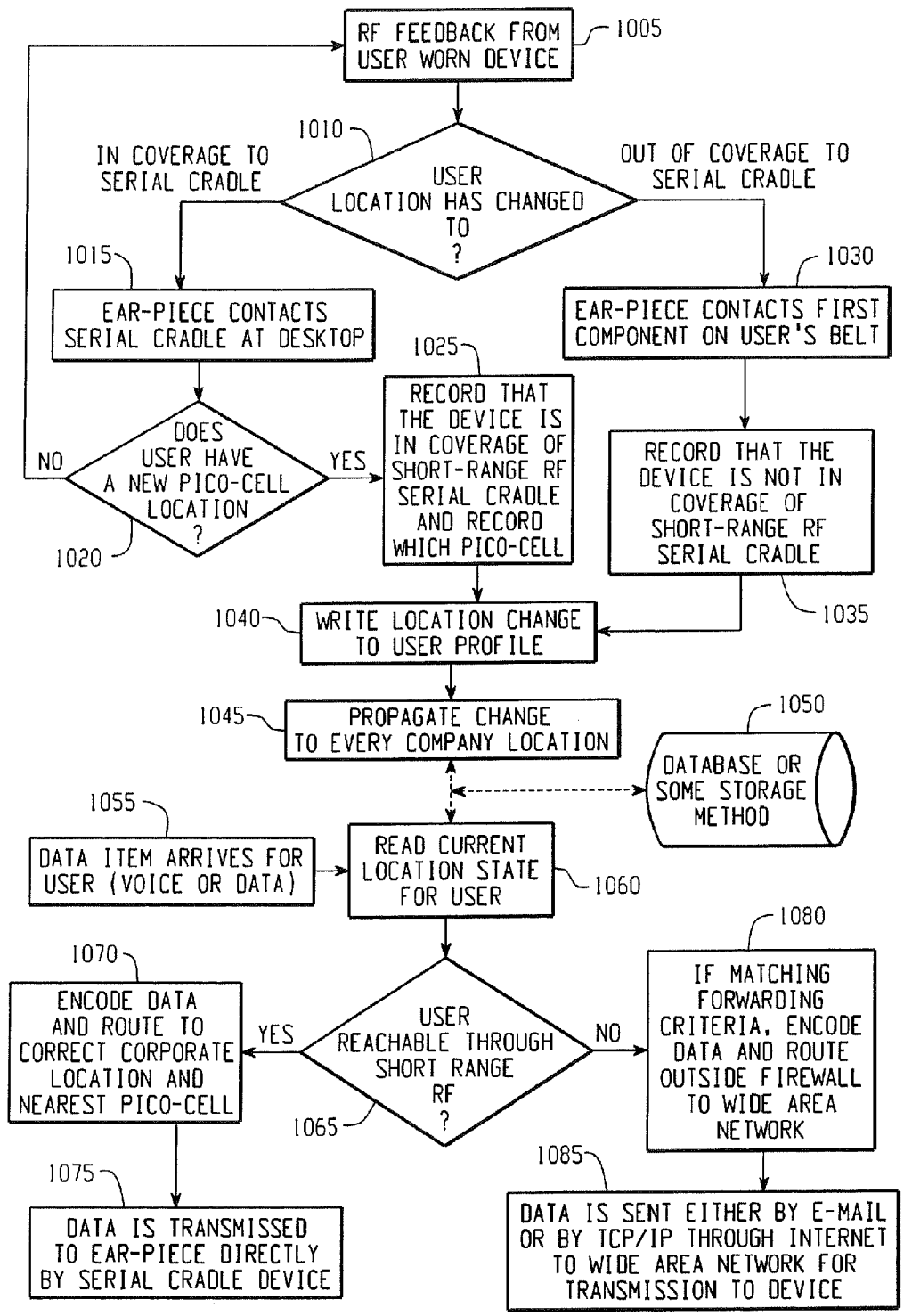

FIG. 9 expands upon FIG. 8, and shows the users moving throughout an office environment and into an environment beyond the office;

FIG. 10 also expands upon FIG. 8, and shows the users moving through a first office environment and into a second, related office environment at a different physical location from the first office environment;

FIG. 11 is a logical flow diagram depicting a series of exemplary steps executed by a redirector application operating at a host system for determining which communication path should be used for routing data items to a particular mobile device; and FIG. 12 is a logical flow diagram depicting a series of exemplary steps executed by a redirector application operating at a host system for determining which communication path should be used for routing data items to a particular mobile device within a corporate environment having a plurality of office locations.

DETAILED DESCRIPTION

Figure 1:
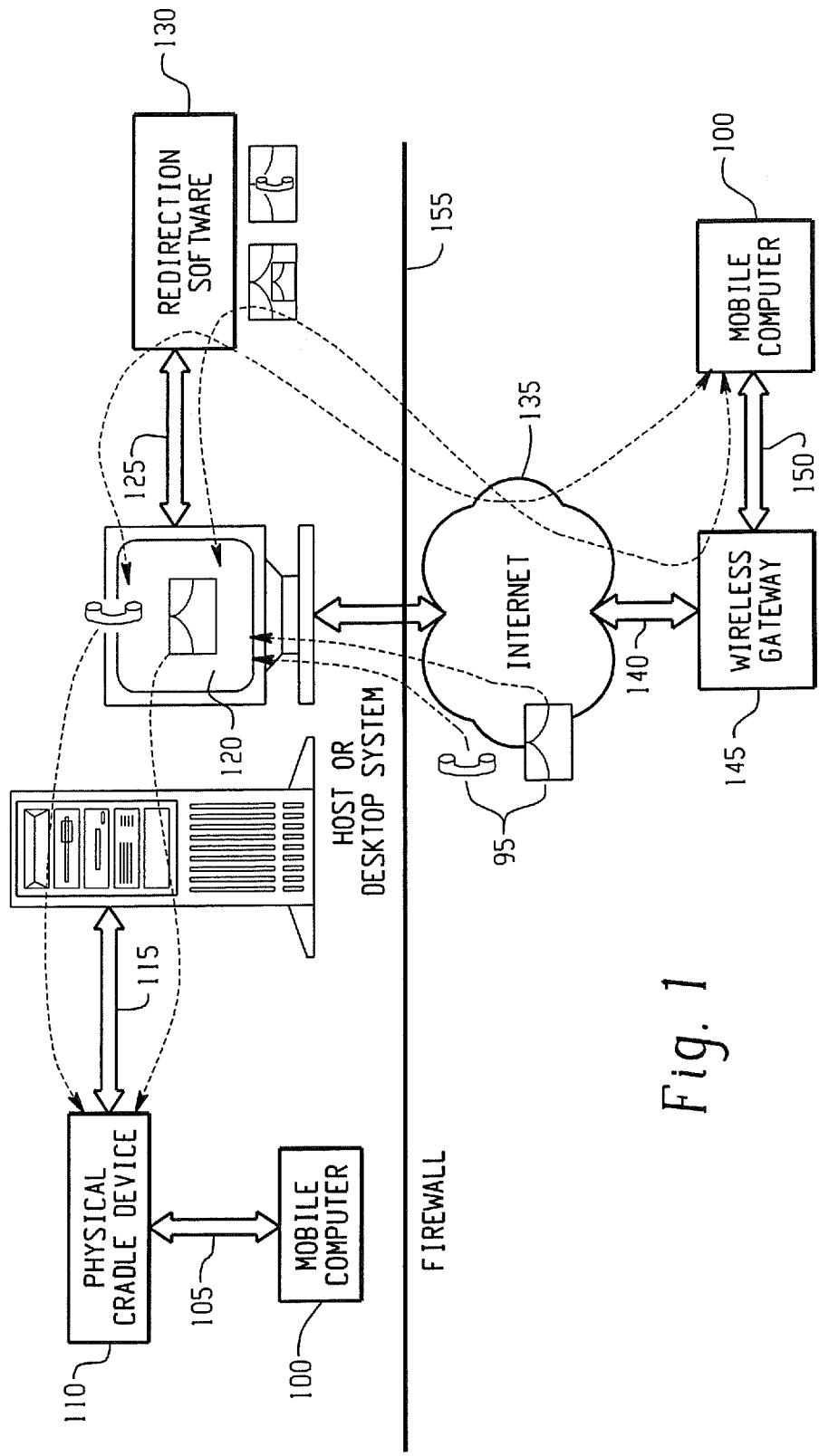
FIG. 1 is a system diagram showing data items being redirected from a host system operating at a user's desktop computer to a mobile device over a plurality of communication paths.

Referring now to the drawing figures, FIG. 1 is a system diagram showing data items 95 being redirected from a host system 120 operating at a user's desktop computer to a mobile device 100 over a plurality of communication paths. In addition to the mobile device 100 and the host system 120, the system includes one or more RF-enabled interface cradles 110, a wide area network 135, a redirector application 130, a wireless gateway 145, and a wireless network 150.

FIG. 1 shows two possible communication paths for redirecting the data items to the mobile device 100. In a first path, the redirector application 130 is in communication with the mobile device 100 via a long-range wireless network comprising a wide area network 135, a wireless gateway 145, and a wireless network 150. The long-range wireless communications path could be, for example, the Mobitex Radio Network ("Mobitex"), the DataTAC Radio Network ("DataTAC"), the Code Division Multiple Access (CDMA) network, the Groupe Special Mobile or the Global System for Mobile Communications (GSM) and the General Packet Radio Service (GPRS), or the future third-generation (3G) networks like UMTS, EDGE and W-CDMA.

In a second path, the redirector application 130 is in communication with the mobile device 100 via a short-range wireless network comprising interface 115, and interface cradle 110, which is preferably equipped with a short-range wireless RF transceiver. The short-range wireless interface could be, for example, a Bluetooth interface, or any other type of short-range RF interface. The interface cradle 110 can communicate with the mobile device in two ways. First, by physically and electrically connecting the mobile device 100 to the cradle 110. Second, by communicating short-range wireless signals between the wireless RF transceiver of the cradle 110 and a short-range wireless transceiver in the mobile device 100.

Figure 2:
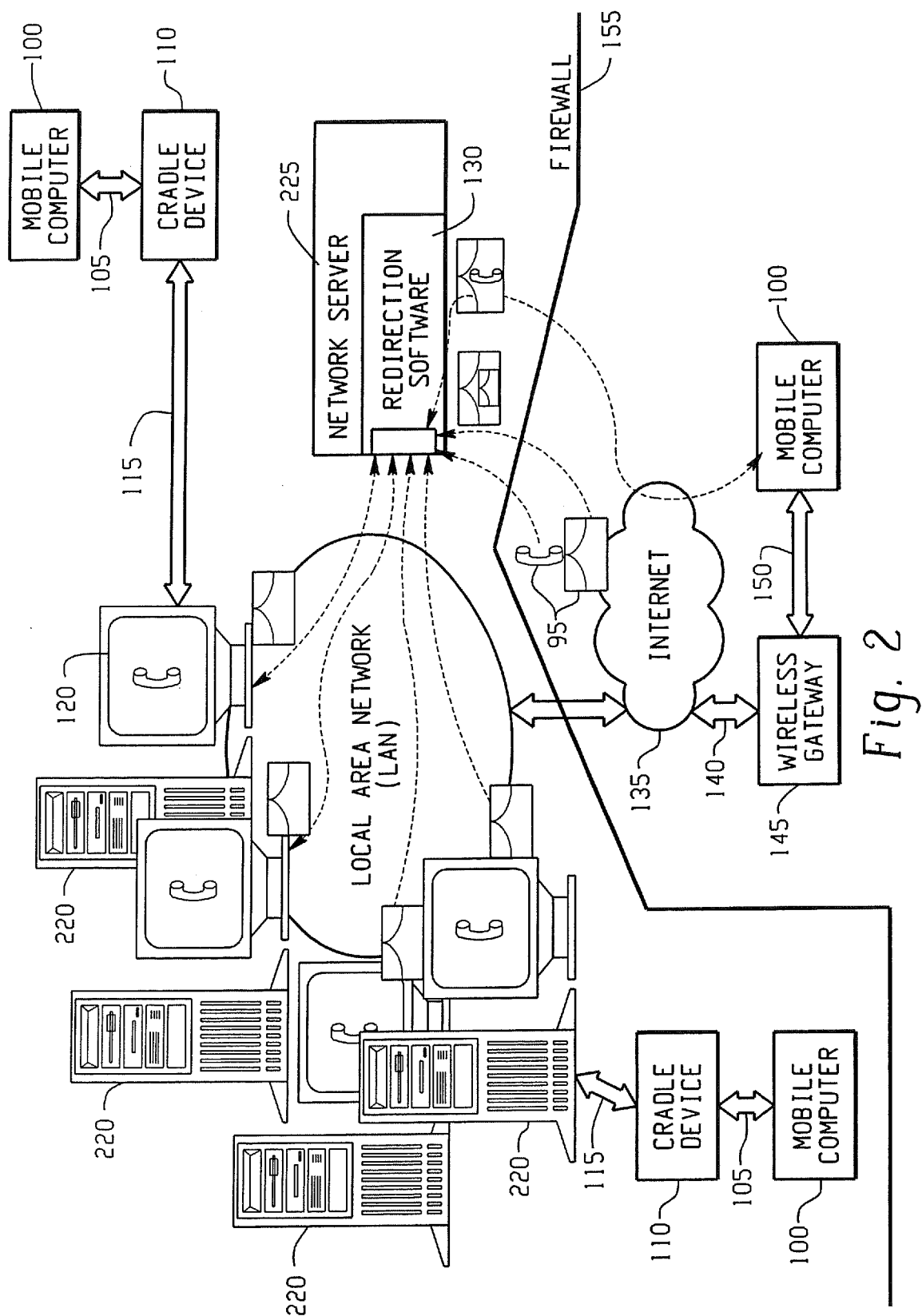
FIG. 2 is a system diagram showing data items being redirected from a host system operating at a network server to a mobile device over a plurality of communication paths.

FIG. 2 is a system diagram showing data items 95 being redirected from a host system 120 operating at a network server 225 to a plurality of mobile devices 100 over a plurality of communication paths. The host system could be a desktop system, a network server, and Internet Service Provider (ISP), a phone switch, a mail router or storage area, an information database, or some other type of primary data center. The host system 120/225 operates as a storage/redirection facility for holding the mobile user's data, and for redirecting the data to the user's mobile device. The host system 120/225 is preferably located behind a corporate firewall 155, which acts as a privacy barrier for protecting sensitive corporate information. The host system can also be directly coupled to the redirector software 130 so that they act as one program. In this embodiment the host system 120 is said to be "wirelessly enabled" by the redirector software 130. This co-operative relationship between the redirection software and the messaging system can be used to wirelessly enable any messaging system. Commonly used messaging systems include Microsoft's™ 'Exchange' e-mail system, IBM's™ Lotus Notes message system and the Internet standard IMAP4 message system.

FIG. 2 is similar to FIG. 1, except that the network server implementation enables a single redirector application 130 to service a plurality of users by receiving data items from a plurality of sources and then by redirecting those data items to a plurality of users. Although a single redirector application 130 is shown in FIGS. 1 and 2, the system can be expanded for use with multiple redirector applications 130.

The redirector application 130 preferably operates on the host system 120, although it could operate on some other system and be in communication with the host system 120 through a network connection. It receives, processes, stores, filters, and redirects data items from the host system 120 to the mobile device 100. The redirector 130 also functions to determine the best communication path over which the data items should be redirected. This determination is based on information collected and stored at the redirector 130 (or accessible by the redirector application) that identifies the approximate physical location of the mobile device user. The redirection program 130 is an event-driven program, operating at the host system 120, which, upon sensing a particular user-defined event has occurred, redirects user-selected data items from the host system to the user's mobile device 100. The redirector program 130 also interfaces to components that can detect the physical location of the user and track the least congested path, shortest path or best propagation path to redirect the user's information. The information can comprise data messages, phone items, video items or any digital or analog information that might be delivered to a user's host system 120. For matter of clarity the term data items will refer to all forms of information to be sent to the user including data, voice, video and other digital information. For a matter of brevity, the term "host system" includes but is not limited to either a standalone desktop computer connected to a LAN, a fixed facility like an ISP's service offering, or a networked computer terminal connected to a server and/or an Internet appliance connected to the Internet or Intranet.

For example, in the network implementation shown in FIG. 2, as a mobile user moves within physical proximity to one of the RF-enabled interface cradles 110, information is sent to the redirector application 130 identifying the mobile device 100 and the network address of the interface cradle 110. Using this information, the redirector application 130 will redirect any incoming or altered data items over the LAN (or other network) to the interface cradle 110 and then to the mobile device via a short-range RF communication path. Once the mobile user moves away from the interface cradle 110, additional information is sent to the redirector application 130 indicating that the user is no longer in physical proximity to the particular cradle 110. The redirector 130 will then redirect any data items to the mobile device 100 over the long-range RF communication path 135, 145, 150 until such time as the mobile user moves within close physical proximity to another interface cradle 110.

A mobile user communicating with this system may have multiple offices in which the user may work from, including a home-based office, a plurality of cubical offices in a plurality of office buildings, a workstation at a remote office space, etc. As the mobile user moves into and out of his home office and the other offices, a wireless communication path between the mobile device 100 and the host system 120 is either established or broken. As the mobile user breaks contact with his home office's physical space (and hence the mobile device 100 breaks contact with an interface cradle 110 at the home office), the redirector program 130 begins to route data, e-mail, voice calls, video calls, etc., and all other direct communications to the mobile device 100 over the long-range wireless network 135, 140, 145. In another embodiment each business office is made up of 'cells' called pico-cells 110 & 605 in this application, shown in detail in FIG. 8. As the user roams within the office, he is preferably re-connected to whichever short-range pico-cell 100 & 605 is located closest to him. In this manner, voice and data may be routed within the corporate firewall 155 and LAN space wirelessly to whichever office or cell a given user is currently located in. Advantageously, this system provides higher-bandwidth, cost effectiveness, rapid delivery of information redirected from the home office. So as a user walked around, having meetings and mini-conferences, all his phone calls, data messages and e-mail message would also take the shortest path to the user within the company's building. Only if the user left the physical proximity of the companies building, or the coverage within the building is insufficient, would the long-range, wide area wireless network have to be used.

It should be understood that the terms "office" and "office environment," as used herein, may refer to any enclosed or partially enclosed location, and are not limited to places in which business is conducted. The term office environment implies a relationship between the user and the host system 120. In most businesses today this relationship is defined by the installation of a firewall 155 around the corporate LAN environment that acts as a privacy barrier for information of all kinds. Advantageously, the invention supports this secure relationship created by the company's firewall 155 and allows information to be routed security to the user without comprising corporate security. The firewall helps to define the relationship between an individual and his corporate data.

Alternatively, the redirector application 130 may be provided with real-time information regarding the quality of the various communication paths to the mobile user, and can use this quality information to determine the best communication path for redirecting the data items. For example, even though the user may have come within close physical proximity to one of the interface cradles 110, the link between the redirector application 130 and the interface cradle 110 may have degraded in quality because of network congestion. In this situation, the redirector 130 would revert to the long-range wireless network 135, 145, 150 in order to redirect information to the mobile device 100. In another example situation, the mobile user is within close physical proximity of two RF-enabled interface cradles 110, but one is less congested then the other (i.e., less mobile users are communicating with one of the cradles than the other). In this situation, the redirector application 130 may determine that the best communication path to the mobile user is through the least congested interface cradle, and will then redirect the data accordingly.

Using the redirector program, the user can select certain data items for redirection, such as phone calls, e-mail messages, calendar events, meeting notifications, address entries, journal entries, personal reminders, etc. As new data item types are added to the system, the user may add these new data item types to a personal preference list maintained by the redirector 130. The user can review a list of items that could be redirected to his or her mobile device, and select those data item types that the user desires for redirection. Having selected the data items for redirection, the user can then configure one or more event triggers to be sensed by the redirector program and to initiate redirection of the user data items. These user-defined trigger points (or event triggers) may include external events, internal events and networked events.

Examples of external events include: receiving a message from the user's mobile data communication device to begin redirection; receiving a similar message from some external computer; sensing that the user is no longer in the vicinity of the desktop computer via the short-range RF link to the cradle; or any other event that is external to the host system. Internal events could be a calendar alarm, screen saver activation, keyboard timeout, programmable timer, or any other user-defined event that is internal to the desktop computer. Networked events are user-defined messages that are transmitted to the host system from another computer coupled to the host system via a network to initiate redirection.

An exemplary redirector application for use with this system is described in more detail in U.S. Pat. No. 6,219,694, entitled "System and Method for Pushing Information from a Host System to a Mobile Data Communication Device," which is commonly assigned with the present application, and the disclosure of which has been incorporated into this application by reference.

The systems shown in FIGS. 1-2 preferably operate as follows. As data items 95 reach the desktop 120 (or network server 225) they are processed by the redirection software 130. The redirection software 130 is preferably operating either within the desktop system 120 or as part of the network server 225. The redirector software 130 determines the best communication path for reaching a particular user associated with an incoming data item and then routes the data item 95 over the best communication path. This determination step can take many forms. In a preferred form, the redirector software 130 maintains a database entry for each mobile device 100 indicating whether the mobile device 100 is currently in the vicinity of an interface cradle 110 having an RF wireless interface, and the network address of that interface cradle 110. If a particular mobile device is within the vicinity of such an interface cradle 110, then the redirector 130 processes and transmits the data item 95 over the LAN (in the example of FIG. 2) or directly to the cradle 110 (in the example of FIG. 1), which then transmits the data item 95 over its short-range RF link to the mobile device 100. If, however, the mobile device 100 is not within the vicinity of any such interface cradle 110, then the redirector application 130 routes the data item over the long-range wireless network 135, 145, 150 to the mobile device 100.

Preferably, when a user of a mobile device 100 comes within the physical proximity of an interface cradle 110 having a short-range RF link, the mobile device 100 transmits a contact message to the cradle 110. This message contact is then processed and contact information is provided to the redirector application 130 indicating that the mobile device 100 is now within the physical proximity of the particular cradle 110. Then, when the mobile device 100 leaves the physical proximity of the particular cradle 100, the cradle 100 senses the lack of communication from the mobile device 100, and notifies the redirector application 130 that the mobile device 100 is no longer in the proximity of the cradle 110. In this manner, the redirector application 130 can determine the approximate physical location of the mobile device 100.

Other exemplary methods of determining the approximate physical location of the mobile device 100 (and hence the user) include: (1) detecting the physical presence of the mobile device 100 in the physical serial cradle 110, (2) detecting the activation of a screen saver program associated with the desktop host system, (3) using heat sensors to determine whether the user has left the area of the host system, (4) using a visual image detector to determine whether the user is not present, or (5) receiving a direct command from the user to redirect information in a certain way. In each of these cases, the redirector application 130 is provided with information that it uses to determine the best communication path for redirecting data to the mobile device 100.

In the case of the network server 225 in FIG. 2, there is an additional step of determining which network workstation 220 received the data item 95. This additional step is necessary in order to associate the data item 95 to a particular mobile device 100. This can be done through special addressing, such as the 'To Address' in an E-mail message, or it can be done using a phone extension for an incoming phone call.

In one embodiment, described in more detail below, the mobile device 100 can be configured with a plurality of wirelessly-enabled components, including (1) a first component 310 for data storage, retrieval, and long-range RF communication, and (2) a second component 305 for audio input/output and short-range RF communication. Alternatively, a short-range RF transceiver may be included in both the first component 310 and the second component 305. The second component 305 is preferably a detachable ear-piece, which is placed in the ear of the user. This second component 305 may communicate directly with the interface cradle 110 via the short-range RF communication link, or it may communicate with the first component 310, which then communicates with the interface cradle 110. The first component 310 is preferably positioned in a device holster attached to the user's belt.

Using this multi-transceiver mobile device 100, if the user is in the same room (or within close physical proximity) as one of the RF-enabled interface cradles 110, then the data items 95 are redirected from the interface cradle 110 either directly to the ear-piece component 305 or to the first component 310. For example, the system may be configured such that voice information, like voice messages or real-time voice calls, are redirected directly to the ear-piece component 305, while data information, such as E-mails, files, or other types of digital data, are redirected to the belt-worn first component 310. In this manner, information is redirected directly to the user with no manual intervention with the desktop computer system 120.

As described above, the host system 120/225 is preferably located behind a corporate firewall system that protects a company's sensitive corporate data. The system described herein operates in conjunction with the company's existing security mechanisms (including the firewall system) by extending an already secure desktop/corporate environment to cover wireless mobile devices. This security takes places through the exchange of a shared secret (such as a public key for encrypted/decrypting data) between the mobile device 100 and the host system 120/225, preferably through the RF-enabled interface cradle 110. This operation effectively extends the corporate firewall around the mobile device 100, thereby creating a virtual private wireless network (VPWN).

Figure 3:
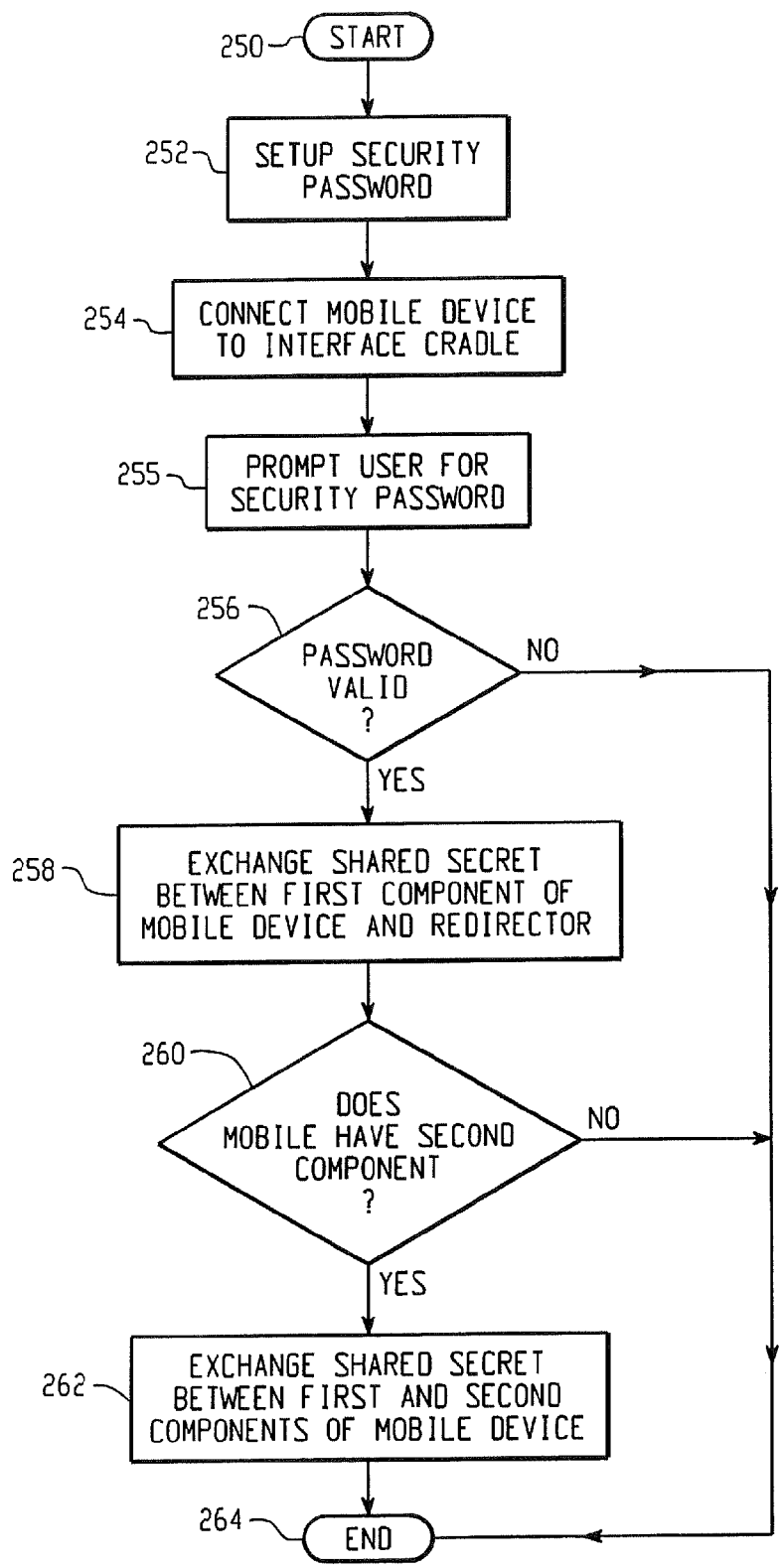
FIG. 3 is a logical flow chart showing how a shared secret can be securely exchanged in the system shown in FIGS. 1-2.

FIG. 3 is a logical flow chart showing how a shared secret can be securely exchanged between a mobile device 100 and a redirector application 130 in the system shown in FIGS. 1-2. The method begins at 250. In step 252, the user configures a security password, which is stored in conjunction with the redirector application 130. When the user is ready to exchange the shared secret, the user places the mobile device 100 in electrical and physical contact 254 with the interface cradle 110. The user is then prompted 255 to enter a security password into the mobile device (or into a desktop system coupled to the interface cradle 110). If the security password is not valid, then the method ends at 264. If, however, the security password is valid, then at step 258 the shared secret is exchanged and stored at the redirector application 130 and within the mobile device 100. This shared secret can then be used by the redirector 130 to encrypt data prior to redirection, and also by the mobile device 100 to decrypt the encrypted data. Similarly, the shared secret can be used to encrypt reply information at the mobile device 100 and to decrypt the encrypted reply information at the redirector 130. At step 260, the method then determines whether the particular mobile device 100 has two wireless components, such as the device mentioned above and described in more detail below. If the mobile device 100 does not have two wireless components, then the method ends 264. If, however, the mobile device 100 includes at least two wireless components, then at step 262 the same (or some other) shared secret is then exchanged between the first component 310 of the mobile device 100 and the second component 305 of the mobile device 100. In this manner, a secure, end-to-end connection can be established between the redirector application 130 and the mobile device 100, including a second wireless component 305 of the mobile device 100.

Figure 4:
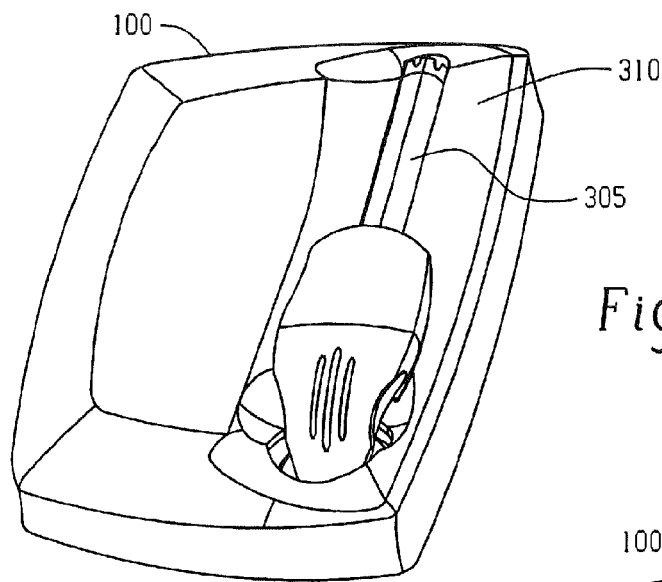
FIG. 4 is a bottom perspective view of an exemplary mobile device having a first wireless component wearable on the user's belt and a second wireless component for insertion in the user's ear.
Figure 5:
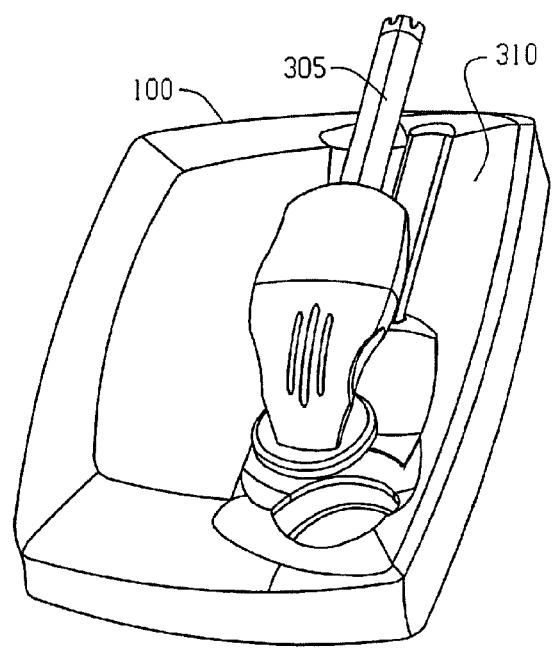
FIG. 5 is another bottom perspective view of the exemplary mobile device shown in FIG. 4, in which the second wireless component has been removed from the first wireless component.
Figure 6:
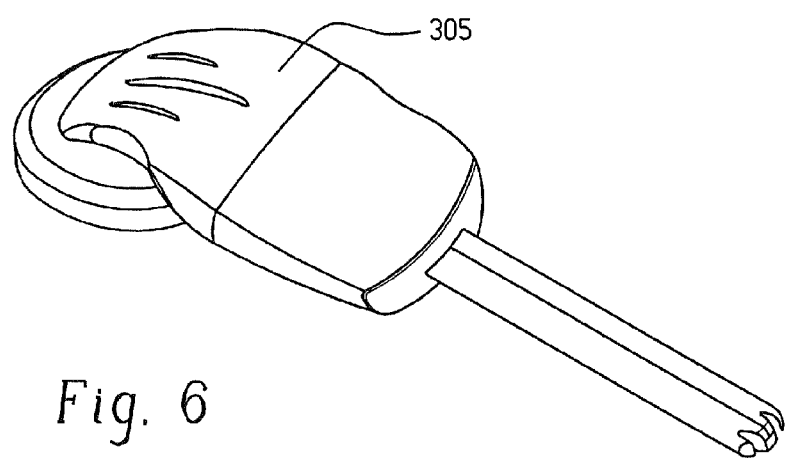
FIG. 6 is a schematic of the second wireless component of the exemplary mobile device shown in FIG. 4.

FIG. 4 is a bottom perspective view of an exemplary mobile device 100 having a first wireless component 310 wearable on the user's belt and a second wireless component 305 for insertion in the user's ear. FIG. 5 is another bottom perspective view of the exemplary mobile device 100 shown in FIG. 4, in which the second wireless component 305 has been removed from the first wireless component 310. FIG. 6 provides a closer image of how the ear-piece or ear-bud 305 can be removed from the belt-worn component 310. This clip-in component 305 can be removed easily and placed into the user's ear. Once removed, the RF transceiver of the ear-piece 305 is preferably automatically activated (by sensing that it is no longer in electrical contact with the first component 310), enabling voice calls to be directly (or indirectly) received by this component 305. When the ear-piece 305 is snapped back into its compartment within the belt-worn component 310, the RF transceiver in the ear-piece 305 is preferably disabled. This automatic shutdown of the ear-piece transceiver provides a method for holding all calls and sending them directly to voice mail. When the first component 310 senses that the ear-piece 305 is in the compartment, it will respond to any incoming voice calls 95 by sending a message back to the redirector 120 that indicates the call cannot be accepted and that it should be routed into the user's voice mail system.

Figure 7:
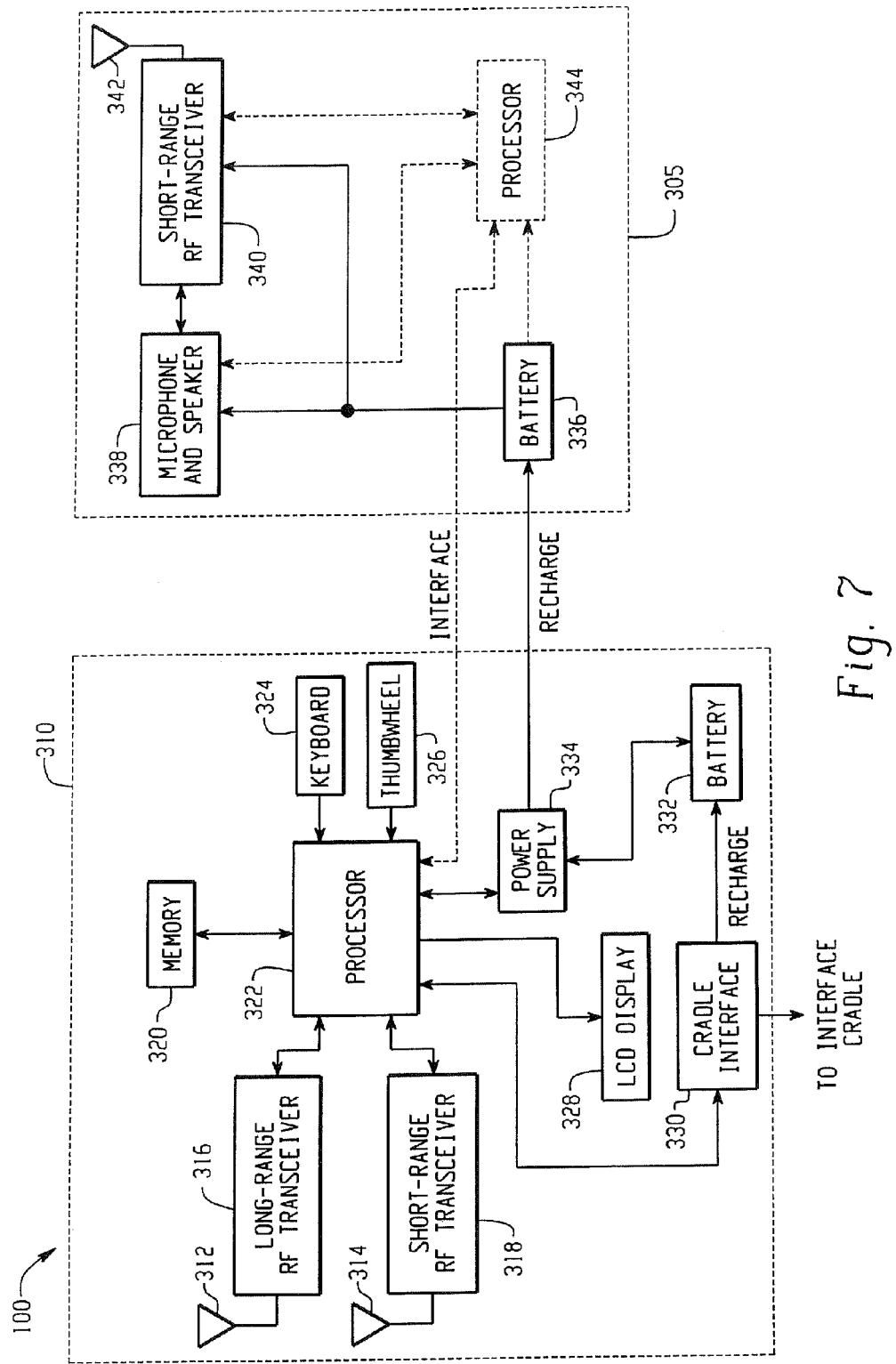
FIG. 7 is an electrical block diagram of the exemplary mobile device shown in FIGS. 4-6.

FIG. 7 is an electrical block diagram of the exemplary mobile device 100 shown in FIGS. 4-6. FIGS. 4-7 describe an exemplary type of mobile device 100 that may be used with the system described herein. Another type of mobile device that could be modified for use with this system is described in co-pending U.S. patent application Ser. Nos. 09/106,585, 09/344,432, 09/543,231, 09/634,774 and 09/663,972. These applications, which are co-owned with the present application, are hereby incorporated herein by reference. The mobile device described in these applications includes only a single wireless RF component for communicating over a single communication path to a long-range wireless network. The device shown in FIG. 4-7 is similar to these devices in that it can communicate over a long-range wireless network, but also includes an RF interface for communicating over a short-range wireless network. This short-range wireless interface is preferably implemented in both the first and second components 310, 305, so that the first component 310 can communicate with the second component 305 over the short-range interface, and also both the first and second components 305, 310 can communicate with the one or more RF-enabled interface cradles 110.

The mobile device 100 shown in FIGS. 4-7 preferably comprises a first RF-enabled component 310 and a second RF-enabled component 305. The first RF-enabled component 310 preferably includes a pair of antennas 312, 314 (although a single antenna structure could be used), a processor 322, a memory 320, an LCD display 328, at least one rechargeable battery 332, a long-range RF transceiver 316, one or more short-range RF transceivers 318, a power supply and recharging circuit 334, a cradle interface circuit 330, and one or more input devices, including, preferably, a keyboard 324 such as described in the above mentioned co-pending applications and a thumbwheel 326. The first component 310 may also include a pressure-sensitive writing tablet.

The input devices 324, 326 on the first component 310 are used to respond to and generate messages, such as E-mail messages. The first component 310 preferably interfaces with a belt-worn holster for receiving the first component 310 and securing it to a user's belt. The long-range RF transceiver 316 is used to send and receive information from the long-range wireless network 135, 145, 150, and the one or more short-range RF transceivers 318 are used to send and receive information from either the RF-enabled interface cradle 110 or the second component 305.

The power supply circuit 334 receives power from the battery 332 and provides conditioned power to the remainder of the circuitry in the first component 310. When the first component 310 is placed in the interface cradle 110, the first component can communicate information with the interface cradle 110, and hence the redirector application 120, via the cradle interface circuit 330. The cradle interface circuit 330 also receives recharging power from the interface cradle 110 for recharging the battery 332.

The second component 305 is preferably an RF-enabled ear-piece that may be connected to (both mechanically and electrically) the first component 310. The second component 305 preferably includes a microphone and a speaker 338, a short-range wireless transceiver 340, an antenna 342, and a rechargeable battery 336. The second component 305 may also include an integral processor 344. When the second component 305 is placed into the first component 310, a shared secret can be exchanged between the two wireless components of the mobile device 100 so that any communications between the first and second components 305/310 may be encrypted. Also, the rechargeable battery 336 of the second component 305 may be recharged by the battery 334 of the first component 310 through power supply recharging circuitry 334 when the two components are in electrical contact.

In other embodiments, the mobile device 100 may include a camera component for displaying or sending video images to the mobile user, or could include sensory circuits for monitoring the mobile user's vital information such as pulse and blood pressure. In these embodiments a nurse or doctor in a hospital floor could wear the first component, while the second might be in a patient's room monitoring some vital statistics. The short-range communication in this example might reach several hundred feet and several second components might be communicating to a single first component. This information could then be relayed on from the first component worn by the nurse or doctor to a central nursing station for all nurses on duty to see and monitor.

One example of how the mobile device 100 shown in FIGS. 4-7 can be used with the system described herein is as follows. When voice calls arrive to the user's desktop computer 120, the short-range wireless cradle 110 informs the desktop 120 whether it can route the call directly to the user's belt component 310. If the user is within communicable distance of the RF-enabled cradle 110, then the call is routed directly from the desktop computer 120 to the belt component 310 via the short-range wireless communication path, and then from the first component 310 to the ear-piece component 305. Alternatively, the call may be routed directly to the second component 305. If, however, the mobile device 100 (and hence the mobile user) is out of range of the interface cradle 110, or is in poor coverage, or is experiencing congestion problems, then the call is routed from the desktop host system 120 via the long-range wireless network 135, 145, 150 to the user's first component 310 of the mobile device 100. Once the call is received from the long-range network, the first component 310 then routes the call to the user's ear-piece component 305, and the phone call is completed preferably without either party to the call knowing that the re-routing has taken place.

In one embodiment, the ear-piece component 305 and the belt component 310 both include short-range RF transceivers that communicate with the RF-enabled interface cradle 110. Using this embodiment of the mobile device 100, voice calls are routed directly from the interface cradle 110 to the ear-piece component 305, and information data messages are routed from the interface cradle 110 to the belt component 310.

The mobile device 100 may also include a natural language-type voice interface between the ear-piece component 305 and the belt component 310. This interface allows the user to interact with the belt component 310 and issue a series of voice commands, such as: "Directory Services," "Find Name: Gary," "Select Gary M," or "Call Gary." In this series of example commands, the interface, which is preferably a software-based interface operating in the belt component 310, would preferably find several "Garys" and then prompt the user to select a particular "Gary." The voice interface may also allow enable the user to issue calling commands that are spoken into the microphone of the second component 305, such as "accept call," "route call," "refuse call," and "send call to voice-mail."

Using the voice interface, for example, the user may, in an important business meeting, temporarily suspend voice calls, but allow messages from their secretary through in the event of an emergency. Or, the first component 310 could be configured to voice caller ID information on incoming voice calls to the user through the second component 305 so that the user may decide whether to answer the call. The first component may, for example, play a message on the second component 305, such as "you have a call from Gary Mousseau, say Accept to accept the call or anything else to send the call to voice mail." Alternatively, the first component 310 might vibrate to indicate that a voice call is arriving, at which point the user could remove the first component and view a display of the caller's ID. Then, the user could interface with the input device(s) on the first component 310 to accept the call, to send it to voice mail, or to hang-up on the caller. In this manner, the mobile device 100 may operate as a hands-free calling center for receiving and transmitting voice calls, in addition to receiving and transmitting a variety of data types.

FIG. 8 depicts a first user 350 of a mobile device 100 such as shown in FIGS. 4-7 communicating via a first communication path comprising a short-range wireless link, and a second user 360 having a mobile device such as shown in FIGS. 4-7 communicating via a second communication path comprising a long range wireless link. In this figure, the first user 350 is in the vicinity of an RF-enabled interface cradle 110, but the second user 360 is not.

The first user 350 is preferably in her office, and has removed the second component 305 from the first component 310 of the mobile device 100 and placed it 305 in her ear. As voice calls or data messages arrive into the user's desktop system 120, the voice calls are preferably routed directly to the second component 305, while the data messages are transmitted to the first component 310. Alternatively, the voice calls may be routed to the first component 310 from the RF interface of the interface cradle 110, and the first component 310 would then transmit the voice calls up to the second component 305. The user's desktop system 120 maybe operating as the redirector 130, or may be operating over a LAN in conjunction with a network-based redirector 225/130. The interface cradle 110 also has an antenna 605 for communicating with both the ear-piece component 305 and the first component 310.

The user 350 may configure the redirector 130 such that if the first component 310 is placed in the interface cradle 110, then the redirector 130 stops redirecting data to the first component 310. In this example, the act of placing the mobile device 100 in the cradle 110 operates as a trigger to stop and start redirection. In a similar embodiment, placing the ear-piece 305 into the first component 310 holder turns off redirection of voice calls to the user's ear from the first component 310. In this later example, if the ear-piece 305 is in the first component 310, which is in turn positioned in the interface cradle 110, then the user's 'traditional' phone or computer may be configured to ring when a voice call arrives.

In the bottom portion of FIG. 8, the second user 360 has moved out of the vicinity of any RF-enabled interface cradles 110. At this point, the ear-piece 305 preferably detects that it can no longer establish RF contact with an interface cradle 110, and thus establishes RF contact directly with the first component 310. Similarly, the first component 310 detects that it also cannot establish an RF link to the interface cradle 110, and, therefore, to maintain an RF link for data and voice, the first component 310 turns on its long-range RF transceiver to make contact with a long-range wireless network. As discussed above, when the mobile device 100 breaks contact with the interface cradle 110, contact information is provided to the redirector 130 so that it can determine whether to redirect information over the long-range RF network.

FIG. 9 expands upon FIG. 8, and shows the users 350/360 moving throughout an office environment and into an environment beyond the office. The office shown in FIG. 9 may include a plurality of RF-enabled interface cradles 110 that form a plurality of wireless 'cells,' referred to herein as pico-cells. As the second user 360 roams within the office, he is preferably connected and re-connected to whichever short-range pico-cell is located closest to him (i.e., which RF-enabled interface cradle 110 he is closest to.) As the user connects, disconnects and connects to the plurality of interface cradles 110, his physical presence is detected by virtue of the RF connections, and routing information is then provided from the cradles 110 to the redirector application 130, which is preferably operating at the network server 225. The redirector application 130 then uses this contact information to alter the location to which the user's data items are redirected. Thus, as the user 360 roams from pico-cell to pico-cell, his data items are automatically redirected to wherever he is physically located.

As the redirected data items 95 (voice and data) arrive for the user 360 they are routed to the correct desktop and sent directly through the interface cradle 110 to the user's ear-piece 305 or belt-worn component 310. Given the data-carrying capacity of current corporate LANs, i.e., 10 megabit or 100 megabit speeds, it is also possible to multiplex more than one voice call, or data exchange with a mobile device through the same interface cradle 110. Thus, more than one user may be served by each of the plurality of interface cradles 110. As the user leaves the office environment, and thus the range of the office pico-cell network, this is detected by the system and the redirector then routes any incoming data items over the long-range wireless network to the mobile device 100.

In this manner, voice and data may be routed behind the corporate firewall and LAN space wirelessly to the current location of the mobile user. As the user moves around the office space, all his phone calls, data messages and E-mail messages would be routed to the mobile device 100 via the network of pico-cells. Only if the user left the physical proximity of the office space, or if the coverage within the office space is insufficient, would the data items then be redirected to the mobile device 100 over the long-range wireless network. FIG. 10 also expands upon FIG. 8, and shows the users 350/360 moving through a first office environment and into a second, related office environment at a different physical location from the first office environment. In this scenario, there may be only a short period of time where the user's mobile device 100 may need to use the long-range network 720, such as when the user is traveling outside the corporate offices.

As the user 360 moves from the first office location to the second office location and enters Office 4 805 and Office 5 810, the user's mobile device 100 is once again in communication with one of the plurality of RF-enabled interface cradles 110 acting as a pico-cell. In this instance, the user's position information is provided to a network server serving the second office location, and is then communicated via a virtual private network (or VPN) 815 over a wide area network to the redirector application operating at the first office location. Thus, the redirector knows that the user is at a particular location in the second office and may redirect the user's voice and data information accordingly.

The VPN 815 may be created with a high-speed point-to-point connection over ISDN, Frame Relay or T1 circuits. Alternatively, many companies create VPNs 815 over the Internet with special security routers on both ends of the connection. The multi-office pico-cell solution shown in FIG. 10 is advantageous because it increases the speed at which data can be redirected, and reduces the price for re-routing data items 95 to the user. Generally, long-range wireless data networks may expensive to use. Thus, by redirecting data over the expensive long-range network only when absolutely necessary, the system described herein provides a less expensive wireless redirection solution.

FIG. 11 is a logical flow diagram depicting a series of exemplary steps executed by a redirector application operating at a host system for determining which communication path should be used for routing data items to a particular mobile device. This flow begins either at step 905 or step 945. At step 905, RF feedback from the mobile device 100 is provided to one of the plurality of interface cradles 110. At step 945, data items such as voice calls or digital data messages arrive at the redirector application 130 for a particular mobile device user.

In step 910 the system determines whether the mobile user has changed location. This change information may be generated (1) if the user leaves RF coverage with the closest-range RF link provided by an interface cradle 110, or (2) if the user returns into short-range coverage of an interface cradle 110. If the user has entered short-range RF coverage of an interface cradle, then at step 915 the ear-piece component 305 of the mobile device 100 preferably makes contact with the closest interface cradle 110. A program operating in conjunction with the interface cradle 110 then receives the contact signal from the interface cradle 110 and records this information 920. If, alternatively, the user has just left short-range RF coverage of the interface cradle 110, then at step 925 the ear-piece component 305 will contact the belt-worn component 310 of the mobile device, and the interface cradle 110 will detect that the previously established RF link has been broken. The interface cradle 110 detects that the RF link is missing by performing a periodic PING at the protocol level to check for the presence of one or more ear-piece components 305. This contact information is then passed from the interface cradle 110 to the program operating in conjunction with the interface cradle 110 where it is temporarily stored. In either case (making contact or breaking contact), the contact information is written to a user profile at step 935 for later retrieval 940.

The user profile may be maintained at the desktop system 120 in the example system shown in FIG. 1 where the redirection application 130 is operating at a desktop host. Alternatively, the user profile may be transferred over the LAN to the network server 225 in the example shown in FIG. 2. In any event, the redirector application 130 has access to the most recently written contact information from the plurality of interface cradles 110 from which it may determine where to redirect the user's data items.

At step 945, voice and data items 95 addressed for a particular user arrive into the system. Once items are received, the redirector application queries the user database 940 (where the user profile is stored) to determine whether the user may be reached via one of the one or more pico-cells generated by the plurality of interface cradles 110. If the user is currently marked as reachable through the short-range RF network, then the data items are encoded and routed to the appropriate interface cradle 110. The encoding step ensures that security is maintained between the cradle 110 and the mobile device 100. If the user leaves coverage of the short-range RF network just at the moment that a data item is about to be transmitted to him, then the system detects this occurrence and reverts to using the long-range RF network as described in step 970. Once the data item is encoded and sent to the interface cradle 110, it is preferably received and either (1) transmitted directly to the ear-piece component 305 if it is a voice call, or (2) transmitted directly to the belt-worn component 310 if it is a data message. If the database 940 indicates that the user is not reachable by the short-range RF network, then the data item is encoded for long-range RF transmission in step 970 and is transmitted to the user's mobile device 100 over the long-range wireless network. Preferably, the encoding scheme used for long-range RF transmission is different than that used for short-range RF transmission.

FIG. 12 is a logical flow diagram depicting a series of exemplary steps executed by a redirector application operating at a host system for determining which communication path should be used for routing data items to a particular mobile device within a corporate environment having a plurality of office locations. The steps shown in FIG. 12 are similar to those described above with respect to FIG. 11, but add support for a larger company with branch offices and many pico-cells located throughout the company's locations.

The method begins at step 1005 or 1055. At step 1005, RF feedback from the mobile device 100 is received by the system, preferably at one of the plurality of interface cradles 110. The interface cradle 110 operates in conjunction with a system program that determines, at step 1010, whether the particular mobile device 100 is making or breaking contact with the interface cradle 110. If the mobile device 100 is breaking contact with the interface cradle 110, then at step 1030 the ear-piece component 305 makes contact with the belt-worn component 310 (instead of the interface cradle 110), and at step 1035, the interface cradle 110 determines that it is no longer in communication with the ear-piece component 305 and records this lack-of-contact information.

If, however, the mobile device 100 is making contact with the interface cradle 110, then at step 1015 the ear-piece component 305 makes contact with the interface cradle 110, and at step 1020 the system determines whether the mobile device 100 is making contact with a new pico-cell (i.e., a different interface cradle 110). If the mobile device 100 is not making contact with a new interface cradle 110, then the method reverts to step 1005, and waits for additional RF feedback from the mobile device 100. If, however, the mobile device 100 is making contact with a new pico-cell cradle 110, then control passes to step 1025, where the system records contact information including information that identifies the particular pico-cell interface cradle 110.

At step 1040, the contact information from steps 1025/1035 is then provided to the redirector application 130, which stores this information in the appropriate user profile 1050. If the system includes multiple redirector applications (and perhaps multiple user profiles), then at step 1045 the contact information is propagated to the other redirector applications that may be operating at other company locations from the first redirector.

As data items are received by the redirector (or plurality of redirectors) at step 1055, the redirector reads the user profile 1050 in order to determine the approximate physical location of the user. If the user is reachable via one of the pico-cell interface cradles 110, as determined at step 1065, then control passes to step 1070 where the data items are encoded and routed to the appropriate interface cradle 110. The interface cradle 110 then transmits the data items to the mobile device 100 via the short-range communication path. If the user is not reachable via one of the pico-cell interface cradles 110, then at step 1080 the system determines if the data items are to be redirected (as configured by the user of the mobile device), and if so, then the data items are encoded and routed outside the corporate firewall to the wide-area wireless network and transmitted to the mobile device 100 in step 1085.

Having described in detail the preferred embodiments of the present invention, including the preferred methods of operation, it is to be understood that this operation could be carried out with different elements and steps. This preferred embodiment is presented only by way of example and is not meant to limit the scope of the present invention which is defined by the following claims.

What is claimed is:

1. A mobile communications device operable to communicate with a redirector component associated with a message system, the mobile communications device comprising:
    a long-range RF component configured to communicate with a long-range wireless network;
    a short-range RF component configured to communicate with a short-range wireless communication network organized as a plurality of cells connected in a local area network; and
    a processor operably coupled to a memory containing instructions that when executed by the processor cause the mobile communication device to perform actions including:
        configuring the redirector component to forward selected items received by the redirector component to the mobile communications device,
        determining that the mobile communications device is within coverage of a particular cell of the local area network,
        forwarding an address of the particular cell to the redirector component via the short-range wireless communication network, and
        receiving the selected items forwarded by the redirector component via the short-range wireless communication network when the mobile communication device is within coverage of the short-range wireless communication network.

2. The mobile communications device of claim 1, wherein the selected items have been directed to a user at the message system.

3. The mobile communications device of claim 1, wherein the long-range RF component is configured to communicate with at least one of a Mobitex Radio Network, a DataTAC Radio Network, a General Packet Radio Service (GPRS) network, an Enhanced Data Rates for Global System for Mobile Communications (GSM) Evolution (EDGE) network, a 3rd Generation network, an Integrated Digital Enhanced Network (IDEN), a Code Division Multiple Access (CDMA) network, a Universal Mobile Telecommunications System (UMTS) network, and a Wideband-Code Division Multiple Access (W-CDMA) network.

4. The mobile communications device of claim 2, wherein the selected items are forwarded to the mobile communications device from behind a firewall.

5. The mobile communications device of claim 1, wherein the instructions further cause the mobile communication device to perform the action of receiving the selected items forwarded by the redirector component via the long-range wireless network when the mobile communication device is not within coverage of the short-range wireless communication network.

6. The mobile communications device of claim 1 wherein the selected items for redirection comprise phone calls, e-mail messages, calendar events, meeting notifications, address entries, journal entries and personal reminders.

7. The mobile communications device of claim 1 further comprising an ear-piece component operable to selectively communicate with either the particular cell of the short-range wireless communication network or the short-range RF component of the mobile communication device depending on whether the mobile communication device is in range with respect to the short-range wireless network.

8. A mobile computer, comprising:
a first wireless component including a long-range RF transmitter/receiver and a short-range RF transmitter/receiver, wherein the long-range RF transmitter/receiver is configured to receive data items via a long-range wireless network when the mobile computer is out of range with respect to a short-range wireless network that is organized into a plurality of cells connected in a local area network;
a second wireless component operably coupled to the first wireless component, the second wireless component including another short-range RF transmitter/receiver for selectively communicating with either the short-range wireless network or the short-range RF transmitter/receiver of the first wireless component depending on whether the mobile computer is in range with respect to the short-range wireless network; and
a processor operably coupled to a memory containing instructions that when executed by the processor perform actions including:
configuring a redirector component to forward selected items received by the redirector component to the mobile computer;
determining that the mobile computer is within coverage of a particular cell of the local area network,
forwarding an address of the particular cell to a network node via the short-range wireless communication network, and
receiving the selected items forwarded by the redirector component via the short-range wireless communication network when the mobile computer is in coverage of the short-range wireless communication network.

9. The mobile computer of claim 8, wherein the second wireless component is arranged as an ear-piece that includes a speaker and a microphone.

10. The mobile computer of claim 8, wherein the second wireless component is operable to communicate with the first wireless component via a Bluetooth communications link.

11. The mobile computer of claim 8, wherein the first wireless component includes a visual display and an input means to originate and respond to data messages.

12. The mobile computer of claim 11, wherein the input means is a keyboard.

13. The mobile computer of claim 11, wherein the selected items have been directed to a user at a messaging system associated with the redirector component.

14. The mobile computer of claim 13, wherein the selected items are forwarded to the mobile computer from behind a firewall.

15. The mobile computer of claim 8, wherein the second wireless component includes a voice interface to the first wireless component for communicating voice commands to the first wireless component in a hands-free operation.

16. A method operating at a redirector component associated with a messaging host system at a network node, the method comprising:
configuring, according to a user selection, items to be forwarded to a mobile communication device that is capable of communicating via a short-range wireless communication network and a long-range wireless communication network;
receiving an address of a particular cell of a plurality of cells connected in a local area network when the mobile communications device is within the particular cell's RF antenna coverage;
receiving an item for a user of the mobile communications device at the redirector component and determining that the item is to be forwarded to the mobile communications device;
determining that the mobile communications device is within coverage of the particular cell; and
redirecting the received item to the mobile communications device via the short-range wireless communication network using the particular cell.

17. The method of claim 16, further comprising:
receiving an indication that the mobile communications device is no longer within RF antenna coverage of any of the plurality of cells connected in the local area network;
receiving a second message for the user of the mobile communications device at the redirector component and determining that the second item is to be forwarded to the mobile communication device;
determining that the mobile communication device is not within coverage of the local area network; and
redirecting the second received message to the mobile communications device via the long-range wireless communication network.

18. The method of claim 16, wherein the items received for the user have been directed to the user at the messaging host system.

19. The method of claim 18, wherein the messaging host system is behind a firewall.

* * * * *